United States Patent [19]

Muramatsu et al.

[11] Patent Number: 5,320,999
[45] Date of Patent: * Jun. 14, 1994

[54] EXHAUST GAS CLEANER AND METHOD OF CLEANING EXHAUST GAS

[75] Inventors: Gyo Muramatsu; Akira Abe; Kiyohide Yoshida; Satoshi Sumiya; Nobuyuki Matsumura; Yoshikazu Takahashi, all of Kumagaya, Japan

[73] Assignee: Kabushiki Kaisha Riken, Tokyo, Japan

[*] Notice: The portion of the term of this patent subsequent to Apr. 28, 2009 has been disclaimed.

[21] Appl. No.: 993,091

[22] Filed: Dec. 18, 1992

Related U.S. Application Data

[62] Division of Ser. No. 891,180, May 29, 1992, Pat. No. 5,290,530.

[30] Foreign Application Priority Data

May 31, 1991 [JP] Japan .................................. 3-155206
May 31, 1991 [JP] Japan .................................. 3-155212
Jun. 6, 1991 [JP] Japan .................................. 3-162004
Oct. 28, 1991 [JP] Japan .................................. 3-308439

[51] Int. Cl.$^5$ .................. B01J 23/10; B01J 23/58; B01J 23/78; B01J 23/34
[52] U.S. Cl. ..................................... 502/303; 502/304
[58] Field of Search ............... 423/215.5, 239, 239 A; 502/302, 303, 304, 439, 527

[56] References Cited

U.S. PATENT DOCUMENTS

| | | | |
|---|---|---|---|
| 3,896,048 | 7/1975 | Mehalchick et al. | 502/527 X |
| 4,485,191 | 11/1984 | Sekido et al. | 502/303 |
| 5,041,270 | 8/1991 | Fujitani et al. | 423/213.2 |
| 5,059,575 | 10/1991 | Jorgensen et al. | 502/304 |
| 5,075,274 | 12/1991 | Kiyohide et al. | 502/303 |
| 5,108,977 | 4/1992 | Yoshida et al. | 502/303 X |
| 5,141,714 | 8/1992 | Obuchi et al. | 502/303 X |

FOREIGN PATENT DOCUMENTS

| | | |
|---|---|---|
| 4008371 | 9/1990 | Fed. Rep. of Germany . |
| 63-100919 | 5/1988 | Japan . |
| 3047539 | 2/1991 | Japan . |

*Primary Examiner*—Helen M. S. Sneed
*Assistant Examiner*—Douglas J. McGinty
*Attorney, Agent, or Firm*—Brumbaugh, Graves, Donohue & Raymond

[57] ABSTRACT

An exhaust gas containing nitrogen oxides and particulate matter is cleaned by using an exhaust gas cleaner including a heat-resistant, porous filter; a porous ceramic powder layer formed on the filter; and a catalyst supported by the ceramic powder layer, the catalyst consisting essentially of (a) at least one of alkali metal elements, (b) cobalt and/or manganese, (c) vanadium, and (d) at least one of rare earth elements, whereby the nitrogen oxides are reduced by the particulate matter in the exhaust gas serving as a reducing agent.

8 Claims, No Drawings

EXHAUST GAS CLEANER AND METHOD OF CLEANING EXHAUST GAS

This application is a division of application Ser. No. 07/891,180, filed on May 29, 1992, now U.S. Pat. No. 5,290,530.

BACKGROUND OF THE INVENTION

The present invention relates to an exhaust gas cleaner and a method of cleaning an exhaust gas by using such an exhaust gas cleaner, and more particularly to an exhaust gas cleaner capable of efficiently removing nitrogen oxides and fine carbonaceous particles simultaneously from exhaust gases of diesel engines, etc., and a method of cleaning an exhaust gas by using such an exhaust gas cleaner.

Recently, fine carbonaceous particles (hereinafter referred to simply as "particulate matter") and nitrogen oxides (hereinafter referred to simply as "NOx") contained in exhaust gases of diesel engines, etc. are causing environmental problems. In particular, the particulate matter having an average particle size of 0.1–1 $\mu$m is likely to float in the air and be inhaled by breathing. As a result of recent clinical tests, it is confirmed that the particulate matter contains carcinogenic substances.

As a method for removing the particulate matter, there are two candidates:

One method comprises the steps of trapping the particulate matter in heat-resistant filters by filtrating exhaust gases, and burning the trapped particulate matter by a burner, an electrical heater, etc. when a pressure drop increases due to the particulate matter accumulated, to regenerate filters. The heat resistant filters may be honeycomb-type ceramic filters, foam-type ceramic filters having three-dimensional network structures, steel wool, wire mesh, etc. The other method comprises the step of trapping and self-burning the particulate matter by the action of catalysts supported by the above filters.

In the former method, as the efficiency for removing the particulate matter increases, the pressure drop increases more quickly, meaning that the filters are required to be regenerated more frequently with a high reliability, leading to an economical disadvantage.

In contrast, the latter method is considered to be excellent as long as a proper catalyst exists, which is capable of maintaining a catalytic activity under the conditions of the exhaust gases of diesel engines with which the catalyst is brought into contact (gas composition, gas temperature, etc).

However, since a diesel oil is used as a fuel in diesel engines, exhaust gases contain a large amount of $SO_2$. The oxygen concentration in exhaust gases varies in a wide range of 2-20%, depending upon the operation conditions of diesel engines. Under these conditions, there has been no established method of well igniting and burning fine carbon particles accumulated without causing secondary pollution.

For instance, as catalysts for removing particulate matter from exhaust gases, which have been proposed so far, there are precious metal catalysts and base metal catalysts. The precious metal catalysts are durable and function efficiently to oxidize CO and unburned hydrocarbons (hereinafter referred to simply as "HC"), but it is likely to convert $SO_2$ existing in exhaust gases to $SO_3$, leading to secondary pollution. Besides, there are problems such that ignition activity of soot in the particulate matter is lowered. On the other hand, the base metal catalysts are effective for removing the particulate matter, but their durability is poor.

Most of the catalysts for exhaust gas cleaners, which have been proposed hitherto, mainly function to lower the ignition temperature of particulate matter, leaving unsolved the problems of removing NOx from exhaust gases of diesel engines having a large oxygen concentration and/or a considerably variable oxygen concentration.

Japanese Patent Laid-Open No. 3-47539 discloses an exhaust gas cleaner comprising a heat-resistant, porous filter, a first catalyst supported by the filter in the inlet region, and a second catalyst supported by the filter in the outlet region, the first catalyst consisting essentially of (a) one or more alkali metal elements, (b) one or more elements in Groups IB, IIA, IIB, transition metal elements of the Periodic Table and Sn, and (c) one or more rare earth elements, and the second catalyst consisting essentially of at least one platinum-group element. By this exhaust gas cleaner, NOx and particulate matter are removed by the first catalyst in the inlet region by using mainly particulate matter and HC as reducing agents, and HC, CO, and other toxic gases are removed by the second catalyst in the outlet region. However, according to their research, the catalytic activity of this catalyst is not satisfactory even when any one of the transition metal elements is selected.

OBJECT AND SUMMARY OF THE INVENTION

Accordingly, an object of the present invention is to provide an exhaust gas cleaner capable of efficiently removing not only particulate matter but also nitrogen oxides from exhaust gas having a considerably variable oxygen concentration, particularly from exhaust gas containing large amounts of nitrogen oxides, particulate matter and unburned hydrocarbons.

Another object of the present invention is to provide an exhaust gas cleaner capable of efficiently removing particulate matter, nitrogen oxides, HC, CO, etc. from exhaust gas having a considerably variable oxygen concentration at a relatively low temperature.

A further object of the present invention is to provide a method of cleaning an exhaust gas by using the above exhaust gas cleaner.

As a result of intense research in view of the above objects, the inventors have found that by using an exhaust gas cleaner comprising a heat-resistant, porous filter with a porous ceramic powder which carries a catalyst consisting essentially of at least one alkali metal element, particular transition elements and at least one rare earth metal element, the particulate matter and the nitrogen oxides can be efficiently removed simultaneously from the exhaust gas having a considerably variable oxygen concentration, and the cleaning-efficiency of the exhaust gas cleaner can be kept high for a long period of time. The inventors also have found that when the exhaust gas contains large amounts of unburned hydrocarbons, the amount of the catalyst should rather be limited in order to increase the efficiency of removing NOx at a lower regeneration temperature. The inventors further have found that by combining a first catalyst consisting of an alkali metal, a particular transition metal and a rare earth metal in the inlet region of the filter and a second catalyst of a Pt-group metal in the outlet region of the filter, such toxic gases as NOx, HC, CO, etc. as well as particulate matter can be efficiently removed for a long period of time. The present invention is based on these findings.

Thus, the first exhaust gas cleaner according to the present invention comprises a heat-resistant, porous filter, a porous ceramic powder layer formed on the filter, and a catalyst supported by the ceramic powder layer, the catalyst consisting essentially of:
- (a) at least one of alkali metal elements;
- (b) cobalt and/or manganese;
- (c) vanadium; and
- (d) at least one of rare earth elements.

The first method of cleaning an exhaust gas containing nitrogen oxides and particulate matter according to the present invention comprises using the above first exhaust gas cleaner, whereby the nitrogen oxides are reduced by the particulate matter in the exhaust gas serving as a reducing agent.

The second exhaust gas cleaner according to the present invention comprises a heat-resistant, porous filter, and a catalytic layer formed on the filter, the catalytic layer comprising a uniform mixture of a ceramic powder carrier, and a catalyst consisting essentially of:
- (a) at least one of alkali metal elements;
- (b) cobalt and/or manganese;
- (c) vanadium; and
- (d) at least one of rare earth elements, the catalyst being 1-20 parts by weight and the ceramic powder carrier being 1-10 parts by weight per 100 parts by weight of the filter.

The second method of cleaning an exhaust gas containing nitrogen oxides and particulate matter according to the present invention comprises using the above second exhaust gas cleaner, whereby the nitrogen oxides are reduced by the particulate matter in the exhaust gas serving as a reducing agent.

The third exhaust gas cleaner according to the present invention comprises a heat-resistant, porous filter, a porous ceramic powder layer formed on the filter, and a catalyst supported by the ceramic powder layer, the catalyst consisting essentially of:
- (a) at least one of alkali metal elements;
- (b) at least one element selected from the group consisting of copper, cobalt, manganese and vanadium; and
- (c) at least one of rare earth elements, the porous ceramic powder layer being 3-15 parts by weight per 100 parts by weight of the filter, and the catalyst being 2.0-7.0 weight % based on the porous ceramic powder layer.

The third method of cleaning an exhaust gas containing nitrogen oxides, particulate matter and unburned hydrocarbons according to the present invention comprises using the third exhaust gas cleaner, whereby the nitrogen oxides are reduced by the particulate matter and the unburned hydrocarbons in the exhaust gas serving as reducing agents.

The fourth exhaust gas cleaner according to the present invention comprises a heat-resistant, porous filter, a first catalyst supported by the filter in the inlet region, and a second catalyst supported by the filter in the outlet region, the first catalyst consisting essentially of:
- (a) at least one of alkali metal elements;
- (b) at least one of elements selected from the group consisting of copper, cobalt, manganese and molybdenum;
- (c) vanadium; and
- (d) at least one of rare earth elements; and the second catalyst consisting essentially of at least one platinum-group element.

The fourth method of cleaning an exhaust gas containing nitrogen oxides, particulate matter, unburned hydrocarbons and CO according to the present invention comprises using the fourth exhaust gas cleaner, whereby the nitrogen oxides are reduced by particulate matter and unburned hydrocarbons existing as reducing agents in the exhaust gas, and the unburned hydrocarbons and CO remaining in the exhaust gas flowing into the outlet region are oxidized by the second catalyst.

DETAILED DESCRIPTION OF THE INVENTION

The present invention will be explained in detail below.

[1] First exhaust gas cleaner

[A] Heat-resistant, porous filter

Since the heat-resistant, porous filter according to the present invention is exposed to a high-temperature exhaust gas, it is required to have an excellent heat resistance, and particularly an excellent thermal shock resistance. It is also required to have a necessary particulate matter-capturing capacity while causing pressure drop only within the permitted range. Such materials for the heat-resistant, porous filter include ceramics such as alumina, silica, titania, zirconia and their composites such as silica-alumina, alumina-zirconia, alumina-titania, silica-titania, silica-zirconia, titania-zirconia, mullite, cordierite, etc. The filter may be in the form of a honeycomb filter or a foam filter, which is already known.

The shape and the size of the filter may vary depending upon its purpose. When the filter is a cylindrical, ceramic foam-type, it preferably has a diameter of 30-400 mm and a length of 5-30 mm. The ceramic foam-type filter preferably has a porosity of 40-80% and an average pore diameter of about 200-400 $\mu$m. If necessary, a plurality of filters may be stacked or arranged in tandem.

[B] Porous ceramic powder layer

The catalyst is supported by the above heat-resistant, porous filter via a more porous ceramic powder layer formed on the porous filter.

The porous ceramic powder layer may be made of a porous ceramic material having a large surface area such as titania, alumina, zirconia, silica, titania-alumina, alumina-zirconia, alumina-silica, titania-silica, titania-zirconia, etc. Preferably, the porous ceramic powder layer is made of titania ($TiO_2$).

The amount of the ceramic carrier powder may be 3-15 parts by weight per 100 parts by weight of the filter. When the amount of ceramic carrier powder is less than 3 parts by weight, the ceramic carrier cannot support a sufficient amount of the catalyst. On the other hand, when the amount of the ceramic powder exceeds 15 parts by weight, the pressure drop in the exhaust gas cleaner becomes too high. The preferred amount of ceramic powder is 5-12 parts by weight.

The porous ceramic powder layer is formed on the filter by a wash-coating method, a sol-gel method, etc.

In the wash-coating method, the filter is immersed in a slurry of the above porous ceramic carrier material and dried so that a carrier powder layer is formed on the filter.

The sol-gel method comprises hydrolyzing organic salts (for instance, alkoxides) of the ceramic carrier-constituting metals; applying the resulting sol to the filter; bringing the coated filter into contact with water vapor, etc. to form a layer composed of colloidal particles; and drying and burning it to convert it to a carrier layer for the catalyst. For instance, when catalytic metals are to be supported by a titania ($TiO_2$) carrier layer, a solution of Ti alkoxide (for instance, $Ti(O\text{-}isoC_3H_7)_4$) in alcohol is mixed with an acid such as $CH_3COOH$, $HNO_3$, HCl, etc. to prepare a coating solution, and the filter is immersed in the coating solution. After removing the filter from the coating solution, it is reacted with vapor or water to cause gelation. After drying and burning, a thin titania coating is formed on a porous surface of the filter. In the sol-gel method, the acid serves as a hydrolysis catalyst in the course of gelation. However, alkalis may be added in place of the acids to conduct the hydrolysis reaction.

Although the above explanation has been made with respect to the case of using titania as a ceramic carrier material, any other ceramics may be similarly used to support the catalyst by the sol-gel method. For instance, in the case of supporting the catalytic components by alumina, the same methods as above may be used except for using alkoxides of Al. Other porous carriers may be used in the same manner as above.

[C] Catalyst

(1) Composition

The catalyst supported by the above filter via the ceramic powder layer consists essentially of (a) at least one of alkali metal elements; (b) Co and/or Mn, (c) V; and (d) at least one of rare earth elements.

(i) Alkali metal elements the alkali metal element (a) is preferably selected from Na, K and Cs. Particularly when Cs is used, any unburned hydrocarbons including saturated hydrocarbons such as propane, etc. can be reacted with the NOx, so that the NOx is efficiently removed from the exhaust gas. This is due to the fact that the presence of Cs serves to increase the selectivity of the reaction of the hydrocarbons with NOx, thereby reducing the reaction between the hydrocarbons and oxygen in the exhaust gas.

The amount of the component (a), measured as an alkali metal itself (active species), is 10-50 weight % based on the total weight of the catalyst (on a metal basis). When the amount of the alkali metal element is smaller than 10 weight % or larger than 50 weight %, the efficiency of the catalyst to remove particulate matter and NOx simultaneously is low. The preferred amount of the alkali metal element is 15-30 weight %.

(ii) Transition metal elements

The transition metal elements consist of (b) Co and/or Mn, and (c) V.

The amount of the component (b), measured as a metal itself (active species), is 15-65 weight % based on the total weight of the catalyst (on a metal basis). When the amount of Co and/or Mn is smaller than 15 weight %, the ability of the catalyst to ignite particulate matter is low. On the other hand, when the amount of Co and/or Mn is larger than 65 weight %, the function of HC to reduce the amount of NOx is reduced. The preferred amount of Co and/or Mn is 20-50 weight %.

The amount of the component (c), measured as a metal itself (active species), is 15-65% based on the total weight of the catalyst (on a metal basis). When the amount of V is smaller than 15 weight %, the catalyst is less resistant to sulfur. On the other hand, when the amount of V is larger than 65 weight %, the efficiency of the catalyst to remove particulate matter and NOx simultaneously is low. The preferred amount of V is 20-50 weight %.

The total amount of the components (b) and (c) is 30-80 weight %, preferably 40-80 weight %.

(iii) Rare earth elements

The rare earth elements (d) are preferably Ce, La, Nd or Sm, etc., and Misch metal which is a mixture of rare earth elements may be used as the rare earth elements.

The amount of the component (d), measured as a metal itself (active species), is 10-50 weight % based on the total weight of the catalyst (on a metal basis). When the amount of the rare earth element is smaller than 10 weight % or larger than 50 weight %, the efficiency of the catalyst to remove particulate matter and NOx simultaneously is low. The preferred amount of the rare earth element is 15-30 weight %.

The total amount of (a)+(b)+(c)+(d) as metallic active components is generally 1-40 weight %, preferably 5-30 weight % based on the ceramic powder layer.

(2) Carrying catalyst by ceramic powder layer

After forming a porous ceramic carrier layer on the filter by the wash-coating method or the sol-gel method, etc., the carrier layer-coated filter is immersed in aqueous solutions of carbonates, nitrates, acetates, hydroxides, etc. of catalytic components, dried and then burned to obtain the filter supporting the catalyst via the ceramic layer. The catalytic metal salts may be of any type, as long as they are soluble in water, including carbonates, nitrates, acetates, hydroxides, etc. With respect to V, a solution of $NH_4VO_3$ and oxalic acid may be used. Alkali metals and V may simultaneously be applied by using a solution of alkali vanadate.

(3) Function of catalyst

By using the catalyst consisting essentially of the above components, the particulate matter in the exhaust gas can be ignited and burned at a relatively low temperature, and NOx can be efficiently removed with the particulate matter serving as a reducing agent. Specifically, when the particulate matter in the exhaust gas is brought into contact with the above catalyst in the presence of oxygen, the ignition temperature of the particulate matter is lowered. As a result, the particulate matter is burned (oxidized) at a temperature lower than about 450° C. At the same time, NOx is reduced to $N_2$ by the particulate matter serving as a reducing agent, whereby the exhaust gas can efficiently be cleaned. The reason why the reduction of the NOx can efficiently be carried out at a relatively low temperature is that the components (a), (b), (c) and (d) in the catalyst show synergistic effects. By using Co and/or Mn and V as the components (b) and (c), the durability of the catalyst is so high that the catalyst can stably remove NOx for a long period of time.

The exhaust gas of diesel engines, etc. usually contains about 100-500 ppm of the unburned hydrocarbons (HC) and about 200-4000 ppm of the NOx.

Typical examples of the HC may be propane, propylene, ethylene, acetylene, etc. When the unburned HC is hydrocarbons having unsaturated bonds such as propylene, acetylene, etc., previously proposed catalysts containing Cu alone as a catalytic component are effective to some extent to reduce NOx by using the unburned HC as reducing agents (see, for instance, Japanese Patent Laid-Open No. 63-100919). However, when saturated hydrocarbons such as propane, etc. are used as reducing agents, the reduction reaction of NOx does not efficiently take place. This is due to the fact that the reactivity of carbon-carbon bonds is in the following order: triple bonds (acetylene, etc.)>double bonds (ethylene, propylene, etc.)> single bonds (propane, etc.), and that when saturated hydrocarbons having poor reactivity such as propane are used, the reduction reaction of the NOx does not take place sufficiently in the presence of the conventional catalysts.

However, when the catalyst of the present invention is used, the NOx can be efficiently removed even when saturated hydrocarbons such as propane, etc. are used as reducing agents. Accordingly, the removal of NOx is remarkably improved with the catalyst of the present invention as compared to the conventional catalysts.

[D] Method of cleaning exhaust gas

With the first exhaust gas cleaner, the exhaust gas is cleaned. Since the HC in the exhaust gas is mainly composed of methane, ethylene and acetylene, etc., the reduction reaction temperature of the NOx is 200°–500° C., preferably 250°–450° C. When the reaction temperature is too high, the burning of the HC itself takes place, making it ineffective as a reducing agent for the NOx.

When the amount of the HC serving as a reducing agent in the exhaust gas is too small, the HC such as propane, propylene, etc. may be introduced into the exhaust gas in an amount necessary for the reduction of the NOx, before the exhaust gas enters into the exhaust gas cleaner.

[2] Second exhaust gas cleaner

[A] Heat-resistant, porous filter

The heat-resistant, porous filter in the second exhaust gas cleaner may be the same as in the first exhaust gas cleaner.

[B] Catalytic layer

The catalytic layer is composed of a uniform mixture of a catalyst and a ceramic powder carrier.

(1) Catalyst

The catalyst itself may be the same as in the first exhaust gas cleaner. The amount of the catalyst is 1–20 parts by weight per 100 parts by weight of the filter. When the amount of the catalyst is less than 1 parts by weight, it is difficult to remove nitrogen oxides and particulate matter simultaneously from the exhaust gas. On the other hand, even if the amount of the catalyst exceeds 20 parts by weight, the ability of the exhaust gas cleaner to remove nitrogen oxides and particulate matter would not increase accordingly. Therefore, the upper limit of the amount of the catalyst is set at 20 parts by weight. The preferred amount of the catalyst is 5–15 parts by weight.

(2) Ceramic powder carrier

The ceramic powder carrier itself may be the same as in the first exhaust gas cleaner. The amount of the ceramic carrier powder is 1–10 parts by weight per. 0 100 parts by weight of the filter. When the amount of the ceramic carrier powder is less than 1 parts by weight, the ceramic carrier cannot support a sufficient amount of the catalyst. On the other hand, when the amount of the ceramic carrier powder exceeds 10 parts by weight, the pressure drop in the exhaust gas cleaner becomes too high. The preferred amount of ceramic carrier powder is 2–6 parts by weight.

(3) Formation of catalytic layer

The catalytic layer may be formed on the filter by a wash-coating method, a sol-gel method, etc.

In the wash-coating method, the ceramic carrier powder such as titania is impregnated with solutions of the catalyst components, and the filter is then immersed in a slurry of the ceramic carrier powder carrying the catalyst.

In the sol-gel method, a coating solution is first prepared by mixing a solution of the ceramic carrier material with solutions of the catalyst components, and the filter is then immersed in the coating solution. For instance, a solution of Ti alkoxide in alcohol is mixed with an acid such as $CH_3COOH$, $HNO_3$, HCl, etc. and aqueous solutions of catalytic component metal salts to prepare the coating solution, and the ceramic filter is immersed in the coating solution. After removing the ceramic filter from the coating solution, it is reacted with vapor or water to prepare a thin layer of colloidal particles (sol) on the filter, which is then converted to a gel. The gel is dried and then burned to provide a catalyst-supporting ceramic carrier layer. In the sol-gel method, the acid serves as a hydrolysis catalyst in the course of gelation. However, alkalis may be added in place of the acids to conduct the hydrolysis reaction.

By using this sol-gel method, the catalyst can be extremely uniformly dispersed in the ceramic filter, leading to an increase in catalytic activity.

Incidentally, any other ceramics than $TiO_2$ may be similarly used as ceramic carrier materials to support the catalyst by the sol-gel method, etc.

In the second exhaust gas cleaner having the catalytic layer comprising a uniform mixture of the catalyst and the ceramic powder carrier, a relatively large amount of the catalyst can be carried even when the amount of the ceramic carrier powder is small, thereby lowering a pressure drop. This means that a large amount of the catalyst can be applied to the filter, even in the case of using ceramic powder in an amount small enough to prevent a pressure drop.

[C] Method of cleaning exhaust gas

With the second exhaust gas cleaner, the exhaust gas is cleaned under the same conditions as in the first exhaust gas cleaner.

[3] Third exhaust gas cleaner

[A] Heat-resistant, porous filter

The heat-resistant, porous filter in the third exhaust gas cleaner may be the same as in the first exhaust gas cleaner.

[B] Porous ceramic powder layer

The catalyst is supported by the above heat-resistant, porous filter via a more porous ceramic powder layer formed on the porous filter.

The porous ceramic powder layer may be the same as in the first exhaust gas cleaner. In order to increase the reactivity of NOx with the particulate and HC, the porous ceramic powder layer is preferably titania, zirconia, alumina, titania-zirconia, alumina-zirconia, etc.

The amount of the ceramic carrier powder is 3-15 parts by weight, preferably 5-12 parts by weight per 100 parts by weight of the filter.

[C] Catalyst (1) Composition

The catalyst supported by the above filter via the ceramic powder layer consists essentially of (a) at least one of alkali metal elements (Na, K, Cs, etc.); (b) at least one of Cu, Co, Mn and V; and (c) at least one of rare earth elements (Ce, La, Nd, Sm, etc.).

(i) Alkali metal elements

The amount of the component (a), measured as an alkali metal itself (active species), is 5-50 weight % based on the total weight of the catalyst (on a metal basis). When the amount of the alkali metal element is smaller than 5 weight % or larger than 50 weight %, the efficiency of the catalyst to remove particulate matter and NOx simultaneously is low. The preferred amount of the alkali metal element is 10-30 weight %.

(ii) Transition metal elements

It is preferable to use a combination of V and at least one of Cu, Co and Mn. By this combination, the catalytic activity stably lasts long.

The amount of the component (b), measured as a metal itself (active species), is 30-80 weight % based on the total weight of the catalyst (on a metal basis). When the amount of the component (b) is smaller than 30 weight %, the ability of the catalyst to ignite particulate matter is low. On the other hand, when the amount of the component (b) is larger than 80 weight %, the function of HC to reduce the amount of NOx is reduced. The preferred amount of the component (b) is 40-70 weight %.

In the case of a combination of V and at least one of Cu, Co and Mn, a weight ratio of at least one of Cu, Co and Mn to V is preferably about 5/1-1/15. When the weight ratio is larger than 5/1, the resistance of the catalyst to sulfur is low. On the other hand, when the weight ratio is smaller than 1/15, the efficiency of the catalyst to remove particulate matter and NOx simultaneously is low.

(iii) Rare earth elements

The amount of the component (c), measured as a metal itself (active species), is 5-50% based on the total weight of the catalyst (on a metal basis). When the amount of the rare earth element is smaller than 5 weight % or larger than 50 weight %, the efficiency of the catalyst to remove particulate matter and NOx simultaneously is low. The preferred amount of the rare earth element is 10-30 weight %.

The amount of the catalyst (total amount of (a)+(b)+(c)) as metallic active components is determined as 2.0-7.0 weight % based on the ceramic powder layer, judging from the fact that high burning efficiency of particulate matter is obtained in the case of large amounts of catalyst components, while high reactivity of HC with NOx is obtained in the case of small amounts of catalyst components.

When the amount of the catalyst is smaller than 2.0 weight %, sufficient catalytic activity cannot be obtained. On the other hand, when the amount of the catalyst is larger than 7.0 weight %, the efficiency of the catalyst to remove particulate matter and NOx simultaneously is rather low. The preferred amount of the catalyst is 2.0-5.0 weight %.

(2) Carrying catalyst by ceramic powder layer

The same procedures as in the first exhaust gas cleaner may be used.

(3) Function of catalyst

By using the catalyst consisting essentially of the above components, NOx can be efficiently removed with the HC and the particulate matter serving as reducing agents.

[D] Method of cleaning exhaust gas

With the third exhaust gas cleaner, the exhaust gas is cleaned. Since the HC in the exhaust gas is mainly composed of methane, ethylene and acetylene, etc., the reduction reaction temperature of the NOx is 200°-500° C., preferably 250°-450° C. When the reaction temperature is too high, the burning of the HC itself takes place, making it ineffective as a reducing agent for the NOx.

When the amount of the HC serving as a reducing agent in the exhaust gas is too small, the HC such as propane, propylene, etc. may be introduced into the exhaust gas in an amount necessary for the reduction of the NOx, before the exhaust gas enters into the exhaust gas cleaner.

[4] Fourth exhaust gas cleaner

[A] Heat-resistant, porous filter

The heat-resistant, porous filter in the fourth exhaust gas cleaner may be the same as in the first exhaust gas cleaner.

A volume ratio of the inlet region to the outlet region in the filter is preferably 1/4-8/1. Incidentally, the inlet region and the outlet region may be formed in a single filter, or a filter carrying the first catalyst and a filter carrying the second catalyst may be combined at the above volume ratio.

[B] Porous ceramic powder layer

The catalyst may be supported by the above heat-resistant, porous filter via a more porous ceramic powder layer formed on the porous filter.

The porous ceramic powder layer may be the same as in the first exhaust gas cleaner. In order to increase the reactivity of NOx with the particulate and HC, the porous ceramic powder layer is preferably titania, zirconia, alumina, titania-zirconia, alumina-zirconia, etc.

The amount of the ceramic carrier powder may be 5-20 parts by weight per 100 parts by weight of the filter both in the inlet and outlet regions.

In order to reduce pressure drop, the porous ceramic powder layer is formed on the filter by a wash-coating method, a sol-gel method, etc. The wash-coating method and the sol-gel method themselves may be the same as in the first exhaust gas cleaner.

[C] Catalyst (1) First catalyst

The catalyst supported by the inlet region of the filter consists essentially of (a) at least one of alkali metal elements; (b) at least one of Cu, Co Mn and Mo, (c) V; and (d) at least one of rare earth elements.

(i) Alkali metal elements

The amount of the component (a), measured as an alkali metal itself (active species), is 10-50 weight % based on the total weight of the catalyst (on a metal basis). The preferred amount of the alkali metal element is 15-30 weight %.

(ii) Transition metal elements

The amount of the component (b), measured as a metal itself (active species), is 15-65 weight % based on the total weight of the catalyst (on a metal basis). The preferred amount of the component (b) is 20-50 weight %.

The amount of the component (c), measured as a metal itself (active species), is 15-65% based on the total weight of the catalyst (on a metal basis). The preferred amount of V is 20-50 weight %.

(iii) Rare earth elements

The rare earth elements (d) are preferably Ce, La, Nd or Sm, etc., and Misch metal which is a mixture of rare earth elements may be used as the rare earth elements.

The amount of the component (d), measured as a metal itself (active species), is 10-50 weight % based on the total weight of the catalyst (on a metal basis). The preferred amount of the rare earth element is 15-30 weight %.

The total amount of (a)+(b)+(c)+(d) as metallic active components is preferably 0.05-6 weight % based on the ceramic powder layer.

(2) Second catalyst

The second catalyst used together with the first catalyst is composed of a Pt-group metal having a high oxidation capability. The Pt-group metal is preferably Pt, Pd a mixture of Pt and Pd, or a mixture of Pt, Pd and Rh. The second catalyst may contain Au and/or Ag to increase its ability to clean the exhaust gas.

The second catalyst is disposed in the outlet region of the filter to remove the HC and CO remaining in the exhaust gas which has passed through the first catalyst region and entered into the second catalyst region.

The amount of the second catalyst is 0.1-1 weight % based on the ceramic powder layer. When Au and/or Ag is contained, the amount of Au and/or Ag is 50 parts by weight or less, preferably 10-20 parts by weight, per 100 parts by weight of the Pt-group metal.

(3) Carrying catalyst by ceramic powder layer

The first and second catalysts may be applied to a single filter. Alternatively, they may be applied to separate filters which are then combined such that the first catalyst is positioned in the inlet region and the second catalyst is positioned in the outlet region.

In the latter case, the first catalyst may be applied to the filter in the same manner as described above. The second catalyst may be applied to the filter by immersing the filter in an aqueous solution of chloride, etc. of the Pt-group metal and if necessary, an aqueous solution of chloride, etc. of Au and/or Ag, and then drying and burning.

Further, by conducting light irradiation to the filter impregnated with an aqueous solution of platinum-group element compounds such as chlorides of Pt, Pd, Rh, etc., catalyst-carrying efficiency is extremely increased. The irradiation can be conducted by means of a mercury vapor lamp having a power output of 500 W or so. Alternatively, it is possible to deposit the platinum-group element catalyst in the carrier powder by light irradiation and then to coat the catalyst-supporting carrier powder on the filter. By this light irradiation method, the catalyst can be supported by the carrier powder in high dispersion, and the coating layer of the filter can be made thin, whereby pressure drop can be minimized in the high-density, thin-layer portion.

(4) Function of catalyst

By using the first and second catalysts, NOx can be efficiently removed with the particulate matter and HC serving as reducing agents. Specifically, when the particulate matter in the exhaust gas is brought into contact with the first catalyst region in the presence of oxygen, the ignition temperature of the particulate matter is lowered. As a result, the particulate matter is burned (oxidized) at a temperature lower than about 400° C. At the same time, NOx is reduced to $N_2$ by the particulate matter and HC serving as reducing agents, whereby the exhaust gas can efficiently be cleaned. By using a combination of at least one of Cu, Co, Mn and Mo and V, the durability of the catalyst is so high that the catalyst can stably remove NOx for a long period of time. Incidentally, in the first catalyst region, the generation of $SO_3$ can be suppressed because the the first catalyst is composed of base metal compounds.

From the exhaust gas which enters into the second catalyst region, the remaining HC and CO, etc. are removed by the second catalyst.

[D] Method of cleaning exhaust gas

Since the HC in the exhaust gas is mainly composed of methane, ethylene and acetylene, etc., the reduction reaction temperature of the NOx is 200°-500° C., preferably 250°-450° C. When the reaction temperature is too high, the burning of the HC itself takes place, making it ineffective as a reducing agent for the NOx.

When the amount of the HC serving as a reducing agent in the exhaust gas is too small, the HC such as propane, propylene, etc. may be introduced into the exhaust gas in an amount necessary for the reduction of the NOx, before the exhaust gas enters into the exhaust gas cleaner.

Incidentally, in the above explanation, catalyst components are expressed as metal elements. However, the base metal catalysts usually exist in the form of oxides. K, for instance, is actually in the form of $K_2O$. Accordingly, please note that the base metal catalysts may be in the form of oxides.

It is also to be noted that the detailed description of the second to fourth exhaust gas cleaners are omitted for simplicity as long as they are already given with respect to the first exhaust gas cleaner. Accordingly, please refer to the corresponding sections in the part of the the first exhaust gas cleaner for detailed explanations.

The present invention will be described in further detail by way of the following Examples. In each Example and Comparative Example, catalytic components are described simply by metal elements for simplicity, and the amount of each catalyst component is expressed by a weight of a metal component in the catalyst component. For instance, the amount of $Cs_2O$ is expressed by a weight of Cs.

EXAMPLE 1

A ceramic foam-type filter made of cordierite (apparent volume: 2 l, density: 0.65 g/ml) was coated with $TiO_2$ powder in an amount of 10 weight % based on the filter, by a wash-coating method.

The coated filter was impregnated with 2.5 weight % of Co by using an aqueous solution of $CoCl_2$, 2.5 weight % of La by using an aqueous solution of $La(NO_3)_3$, and 2.5 weight % of Cs by using an aqueous solution of $CsNO_3$, each based on $TiO_2$. After drying the impregnated filter, it was burned at 700° C. Next, the burned filter was impregnated with 2.5 weight % of V by using an aqueous solution of $NH_4VO_3$ and oxalic acid. After drying the impregnated filter, it was burned again at 700° C. for 3 hours to produce an exhaust gas cleaner having the following composition:

Cs/Co/V/La ($TiO_2$)

With respect to this exhaust gas cleaner, a regeneration temperature of the filter (expressed by a temperature at which pressure drop started to decrease by burning particulate matter) and a conversion rate of NOx to $N_2$ at the regeneration temperature were measured by using a diesel engine having a displacement of 510 cc. The regeneration temperature and the conversion rate of NOx to $N_2$ were evaluated at two points, i.e., at a time when decrease in pressure drop was observed for the first time in an initial stage of the operation, and at a time when decrease in pressure drop was observed after the lapse of 10 hours from the initiation of the operation. The diesel engine was operated at 1500 rpm under a load of 90%. Under these conditions, the exhaust gas comprised 90 ppm of HC (total of hydrocarbons), 460 ppm of CO, 480 ppm of NOx, 10% of $O_2$ and 200 ppm of $SO_2$. The results are shown in Table 1.

EXAMPLE 2

In the same manner as in Example 1, a ceramic foam-type filter made of cordierite (apparent volume: 2 l, density: 0.65 g/ml) was coated with $TiO_2$ in an amount of 10 weight % based on the filter. The coated filter was impregnated with 2.5 weight % of Co, 2.5 weight % of Ce, and 2.5 weight % of Cs, each based on the $TiO_2$ carrier layer, by using aqueous solutions of $CoCl_2$, $Ce(NO_3)_3$ and $CsNO_3$, respectively. The impregnated filter was dried and burned in the same manner as in Example 1. Next, the burned filter was impregnated with 2.5 weight % of V in the same manner as in Example 1 to produce an exhaust gas cleaner having the following composition:

Cs/Co/V/Ce ($TiO_2$)

EXAMPLE 3

In the same manner as in Example 2, an exhaust gas cleaner supporting 2.5 weight % of Co, 2.5 weight % of La, 2.5 weight % of K and 2.5 weight % of V, each based on $TiO_2$ carrier layer, was produced by using aqueous solutions of $CoCl_2$, $La(NO_3)_3$, KCl and $NH_4VO_3$, respectively. The resulting exhaust gas cleaner had the following composition:

K/Co/V/La ($TiO_2$)

EXAMPLE 4

In the same manner as in Example 2, an exhaust gas cleaner supporting 2.5 weight % of Co, 2.5 weight % of Ce, 2.5 weight % of K and 2.5 weight % of V, each based on the $TiO_2$ carrier layer, was produced by using aqueous solutions of $CoCl_2$, $Ce(NO_3)_3$, KCl and $NH_4VO_3$, respectively. The resulting exhaust gas cleaner had the following composition:

K/Co/V/Ce ($TiO_2$)

EXAMPLES 5 AND 6

In the same manner as in Example 1, catalyst components were applied to the filter except for using manganese acetate in place of $CoCl_2$.

| | |
|---|---|
| Cs/Mn/V/La ($TiO_2$): | (Example 5) |
| Cs/Mn/V/Ce ($TiO_2$): | (Example 6) |

EXAMPLES 7 AND 8

In the same manner as in Example 2, catalyst components were applied to the filter except for using manganese acetate in place of $CoCl_2$.

| | |
|---|---|
| K/Mn/V/La ($TiO_2$): | (Example 7) |
| K/Mn/V/Ce ($TiO_2$): | (Example 8) |

With respect to the resulting exhaust gas cleaners of Examples 2–8, a regeneration temperature and a conversion rate of NOx to $N_2$ at the regeneration temperature were measured in the same manner as in Example 2. The results are shown in Table 1.

COMPARATIVE EXAMPLES 1–8

In the same manner as in Example 1, each of eight ceramic foam-type filters made of cordierite (apparent volume: 2 l, density: 0.65 g/ml) was coated with $TiO_2$ in an amount of 10 weight % based on the filter, by using a wash-coating method.

Each coated filter was immersed in such a combination of aqueous solutions of $La(NO_3)_3$, $Ce(NO_3)_3$, $CoCl_2$, manganese acetate, $CsNO_3$ and KCl as to produce an exhaust gas cleaner supporting the following catalytic metals each in an amount of 2.5 weight % on a metal basis, dried and burned in the same manner as in Example 1.

| | |
|---|---|
| Cs/Co/La ($TiO_2$): | (Comparative Example 1) |
| Cs/Co/Ce ($TiO_2$): | (Comparative Example 2) |
| K/Co/La ($TiO_2$): | (Comparative Example 3) |
| K/Co/Ce ($TiO_2$): | (Comparative Example 4) |
| Cs/Mn/La ($TiO_2$): | (Comparative Example 5) |
| Cs/Mn/Ce ($TiO_2$): | (Comparative Example 6) |
| K/Mn/La ($TiO_2$): | (Comparative Example 7) |
| K/Mn/Ce ($TiO_2$): | (Comparative Example 8) |

With respect to each of these exhaust gas cleaners, a regeneration temperature and a conversion rate of NOx to $N_2$ at the regeneration temperature were measured in the same manner as in Example 1. The results are shown in Table 1.

TABLE 1

| No. | Initial Stage[1] | | After 10 Hours[2] | |
|---|---|---|---|---|
| | Regeneration Temp. (°C.) | Conversion Rate of NOx to N$_2$[3] (%) | Regeneration Temp. (°C.) | Conversion Rate of NOx to N$_2$[3] (%) |
| Example 1 | 390 | 15 | 390 | 18 |
| Example 2 | 395 | 12 | 395 | 15 |
| Example 3 | 410 | 10 | 410 | 14 |
| Example 4 | 410 | 10 | 410 | 14 |
| Example 5 | 410 | 14 | 410 | 18 |
| Example 6 | 415 | 12 | 415 | 16 |
| Example 7 | 420 | 10 | 420 | 14 |
| Example 8 | 420 | 10 | 420 | 14 |
| Comparative Example 1 | 340 | 25 | 420 | 12 |
| Comparative Example 2 | 360 | 20 | 430 | 12 |
| Comparative Example 3 | 370 | 18 | 440 | 10 |
| Comparative Example 4 | 370 | 18 | 450 | 10 |
| Comparative Example 5 | 370 | 24 | 420 | 12 |
| Comparative Example 6 | 375 | 20 | 430 | 12 |
| Comparative Example 7 | 380 | 18 | 440 | 10 |
| Comparative Example 8 | 380 | 18 | 450 | 10 |

Note
[1] Measured at a time when decrease in pressure drop was first appreciated.
[2] Measured at a time when decrease in pressure drop was first appreciated after 10 hours from the initiation of passing exhaust gas through the filter.
[3] Calculated from the amount (Xa) of NOx in exhaust gas before entering into the filter, and the amount of (Xb) of NOx in exhaust gas after passage through the filter, by using the formula: (Xa − Xb)/Xa.

As is clear from Table 1, the exhaust gas cleaners of Examples 1-8 show high conversion rates of NOx to N$_2$ than those of Comparative Examples 1-8, when 10 hours passed after the operation had started. Also, at a time after the lapse of 10 hours, the regeneration temperature of the filter at which particulate matter is ignited and burned is lower in Examples than in Comparative Examples, meaning that exhaust gas is efficiently cleaned for a long period of time in the present invention.

EXAMPLE 9

To prepare a coating solution, a solution of Ti alkoxide (Ti(O-isoC$_3$H$_7$)$_4$) in alcohol was mixed with acetic acid, and then mixed with an aqueous solution of CoCl$_2$, an aqueous solution of La(NO$_3$)$_3$, an aqueous solution of CsNO$_3$, and a mixture of an aqueous solution of NH$_4$VO$_3$ and oxalic acid.

A ceramic foam-type filter made of cordierite (apparent volume: 0.25 l, density: 0.65 g/ml) was immersed in the resulting coating solution. After removing the filter from the coating solution, the impregnated filter was brought into contact with water vapor to cause gelation. After drying, it was burned again at 600° C. for 3 hours to produce a filter element provided with a catalytic layer. 4 filter elements were stacked to produce an exhaust gas cleaner having an apparent volume of 1 l.

The amount of TiO$_2$ was 3 weight % based on the filter, and the amounts of Co, La, Cs and V on a metal basis were all 1.5 weight % based on the filter. The composition of the exhaust gas cleaner was as follows:

Cs/Co/V/La (TiO$_2$)

With respect to this exhaust gas cleaner, a pressure drop due to the capturing of particulate matter, a regeneration temperature of the filter (expressed by a temperature at which pressure drop started to decrease by burning particulate matter) and a conversion rate of NOx to N$_2$ at the regeneration temperature were measured by using a diesel engine having a displacement of 500 cc. The regeneration temperature and the conversion rate of NOx to N$_2$ were evaluated at two points, i.e., at a time when decrease in pressure drop was observed for the first time in an initial stage of the operation, and at a time when decrease in pressure drop was observed after the lapse of 10 hours from the initiation of the operation. The diesel engine was operated at 2500 rpm under a load of 80%. Under these conditions, the exhaust gas comprised 90 ppm of HC (total of hydrocarbons), 460 ppm of CO, 480 ppm of NOx, 10% of O$_2$ and 200 ppm of SO$_2$. The results are shown in Table 2.

EXAMPLE 10

Example 9 was repeated except for using manganese acetate in place of CoCl$_2$. The composition of the exhaust gas cleaner was as follows:

Cs/Mn/V/La (TiO$_2$)

EXAMPLE 11

Example 9 was repeated except for using Ce(NO$_3$)$_3$ in place of La(NO$_3$)$_3$, and changing the amount of ceramic carrier component. The composition of the exhaust gas cleaner was as follows:

Cs/Co/V/Ce (TiO$_2$)

The amount of TiO$_2$ was 4 weight % based on the filter, and the amounts of Co, Ce, Cs and V on a metal basis were all 1.5 weight % based on the filter.

EXAMPLE 12

Example 10 was repeated except for using Ce(NO$_3$)$_3$ in place of La(NO$_3$)$_3$, and changing the amount of ceramic carrier component. The composition of the exhaust gas cleaner was as follows:

Cs/Mn/V/Ce (TiO$_2$)

The amount of TiO$_2$ was 4 weight % based on the filter, and the amounts of Mn, Ce, Cs and V on a metal basis were all 1.5 weight % based on the filter.

EXAMPLE 13

A slurry of potassium titanate, La(NO$_3$)$_3$, Co(NO$_3$)$_2$, and a mixture of an aqueous solution of NH$_4$VO$_3$ and oxalic acid was prepared.

The same filter as in Example 9 was immersed in the resulting slurry. After removing the filter from the slurry and drying, it was burned at 700° C. for 3 hours to produce a filter element provided with a catalytic layer. 4 filter elements were stacked to produce an exhaust gas cleaner having an apparent volume of 1 l.

The amount of TiO$_2$ was 3 weight % based on the filter, the amount of K on a metal basis was 3 weight % based on the filter, and the amounts of Co, La and V on a metal basis were all 2 weight % based on the filter. The composition of the exhaust gas cleaner was as follows:

K/Co/V/La (TiO$_2$)

EXAMPLE 14

Example 13 was repeated except for using manganese acetate in place of $Co(NO_3)_2$. The composition of the exhaust gas cleaner was as follows:

K/Mn/V/La ($TiO_2$)

EXAMPLE 15

Example 13 was repeated except for using $Ce(NO_3)_3$ in place of $La(NO_3)_3$. The composition of the exhaust gas cleaner was as follows:

K/Co/V/Ce ($TiO_2$)

EXAMPLE 16

Example 14 was repeated except for using $Ce(NO_3)_3$ in place of $La(NO_3)_3$. The composition of the exhaust gas cleaner was as follows:

K/Mn/V/Ce ($TiO_2$)

With respect to the resulting exhaust gas cleaners of Examples 10-16, the pressure drop, the regeneration temperature and the conversion rate of NOx to $N_2$ at the regeneration temperature were measured in the same manner as in Example 9. The results are shown in Table 2.

COMPARATIVE EXAMPLES 9-16

In the same manner as in Example 9, each of eight ceramic foam-type filters made of cordierite was formed with a catalytic layer of $TiO_2$ containing catalyst components described below.

The amount of the catalytic layer of $TiO_2$+catalyst components was 10 weight % based on the filter, and the amount of each metal component on a metal basis was 2.5 weight % based on the filter.

| | |
|---|---|
| Cs/Co/La ($TiO_2$): | (Comparative Example 9) |
| Cs/Mn/La ($TiO_2$): | (Comparative Example 10) |
| Cs/Co/Ce ($TiO_2$): | (Comparative Example 11) |
| Cs/Mn/Ce ($TiO_2$): | (Comparative Example 12) |
| K/Co/La ($TiO_2$): | (Comparative Example 13) |
| K/Mn/La ($TiO_2$): | (Comparative Example 14) |
| K/Co/Ce ($TiO_2$): | (Comparative Example 15) |
| K/Mn/Ce ($TiO_2$): | (Comparative Example 16) |

With respect to each of the resulting exhaust gas cleaners of Comparative Examples 9-16, the pressure drop, the regeneration temperature and the conversion rate of NOx to $N_2$ at the regeneration temperature were measured in the same manner as in Example 9. The results are shown in Table 2.

TABLE 2

| No.[2] | Pressure drop (mm Hg) | Initial Stage[1] Regeneration Temp (°C.) | Initial Stage[1] Conversion Rate of NOx to $N_2$[3] | After 10 Hours[4] Regeneration Temp (°C.) | After 10 Hours[4] Conversion Rate of NOx to $N_2$[3] |
|---|---|---|---|---|---|
| Ex. 9 | 50 | 390 | 18 | 390 | 18 |
| Ex. 10 | 52 | 400 | 17 | 390 | 17 |
| Ex. 11 | 70 | 400 | 13 | 400 | 13 |
| Ex. 12 | 70 | 405 | 14 | 405 | 14 |
| Ex. 13 | 68 | 405 | 12 | 405 | 12 |
| Ex. 14 | 67 | 405 | 12 | 405 | 12 |
| Ex. 15 | 70 | 410 | 12 | 410 | 12 |
| Ex. 16 | 71 | 410 | 10 | 410 | 10 |
| Com. Ex. 9 | 95 | 390 | 18 | 430 | 15 |
| Com. Ex. 10 | 96 | 395 | 16 | 430 | 12 |
| Com. Ex. 11 | 100 | 410 | 15 | 435 | 12 |
| Com. Ex. 12 | 102 | 412 | 14 | 435 | 10 |
| Com. Ex. 13 | 100 | 415 | 13 | 440 | 10 |
| Com. Ex. 14 | 98 | 415 | 12 | 445 | 10 |
| Com. Ex. 15 | 95 | 415 | 13 | 445 | 10 |
| Com. Ex. 16 | 96 | 415 | 13 | 445 | 10 |

Note
[1] Measured at a time when decrease in pressure drop was first appreciated.
[2] Ex.: Example, and Com. Ex.: Comparative Example.
[3] Calculated from the amount (Xa) of NOx in exhaust gas before entering into the filter, and the amount of (Xb) of NOx in exhaust gas after passage through the filter, by using the formula: (Xa − Xb)/Xa.
[4] Measured at a time when decrease in pressure drop was first appreciated after 10 hours from the initiation of passing exhaust gas through the filter.

As is clear from Table 2, the exhaust gas cleaners of Examples 9-16 show smaller pressure drop than those of Comparative Examples 9-16, and even after the lapse of 10 hours, they show high conversion rates of NOx to $N_2$ than those of Comparative Examples 9-16. Also, at that time, the regeneration temperature of the filter at which particulate matter is ignited and burned is lower in Examples than in Comparative Examples, meaning that exhaust gas is efficiently cleaned for a long period of time in the present invention.

EXAMPLE 17

A ceramic foam-type filter made of cordierite (apparent volume: 2 l, density: 0.65 g/ml) was coated with $TiO_2$ powder in an amount of 10 weight % based on the filter, by a wash-coating method.

The coated filter was impregnated with 1 weight % of Cu by using an aqueous solution of $CuCl_2$, 1 weight % of La by using an aqueous solution of $La(NO_3)_3$, and 1 weight % of Cs by using an aqueous solution of $CsNO_3$, each based on $TiO_2$. After drying the impregnated filter, it was burned at 700° C. In the resulting exhaust gas cleaner, metal components of Cu, La and Cs existed as metal oxides. The composition of the exhaust gas cleaner was as follows:

Cs/Cu/La ($TiO_2$)

With respect to this exhaust gas cleaner, a regeneration temperature of the filter (expressed by a temperature at which pressure drop started to decrease by burning particulate matter) and a conversion rate of NOx to $N_2$ at the regeneration temperature were measured by using a diesel engine having a displacement of 510 cc. The diesel engine was operated at 1500 rpm under a load of 90%. Under these conditions, the exhaust gas comprised 150 ppm of HC (total of hydrocarbons), 460 ppm of CO, 480 ppm of NOx, 10% of $O_2$ and 200 ppm of $SO_2$. The results are shown in Table 3.

EXAMPLE 18

In the same manner as in Example 17, a ceramic foam-type filter made of cordierite was coated with $TiO_2$ in an amount of 10 weight % based on the filter. The coated filter was impregnated with 1 weight % of Cu, 1 weight % of Ce, and 1 weight % of Cs, each based on the $TiO_2$ carrier layer, by using aqueous solutions of $CuCl_2$, $Ce(NO_3)_3$ and $CsNO_3$, respectively. The impregnated filter was dried and burned in the same manner as in Example 17 to produce an exhaust gas cleaner having the following composition:

Cs/Cu/Ce ($TiO_2$)

EXAMPLE 19

In the same manner as in Example 18, an exhaust gas cleaner supporting 1 weight % of Cu, 1 weight % of La, and 1 weight % of K, each based on $TiO_2$ carrier layer, was produced by using aqueous solutions of $CuCl_2$, $La(NO_3)_3$, and KCl, respectively. The composition of the exhaust gas cleaner was as follows:

K/Cu/La ($TiO_2$)

EXAMPLE 20

In the same manner as in Example 18, an exhaust gas cleaner supporting 1 weight % of Cu, 1 weight % of Ce, and 1 weight % of K, each based on the $TiO_2$ carrier layer, was produced by using aqueous solutions of $CuCl_2$, $Ce(NO_3)_3$, and KCl, respectively. The composition of the exhaust gas cleaner was as follows:

K/Cu/Ce ($TiO_2$)

EXAMPLES 21-24

Examples 17-20 were repeated except for using $CoCl_2$ in place of $CuCl_2$, and changing the types of ceramic carrier powder.

| | |
|---|---|
| Cs/Co/La ($Al_2O_3$): | (Example 21) |
| Cs/Co/Ce ($Al_2O_3$-$ZrO_2$): | (Example 22) |
| K/Co/La ($ZrO_2$): | (Example 23) |
| K/Co/Ce ($TiO_2$-$ZrO_2$): | (Example 24) |

EXAMPLES 25-28

Examples 17-20 were repeated except for using manganese acetate in place of $CuCl_2$.

| | |
|---|---|
| Cs/Mn/La ($TiO_2$): | (Example 25) |
| Cs/Mn/Ce ($TiO_2$): | (Example 26) |
| K/Mn/La ($TiO_2$): | (Example 27) |
| K/Mn/Ce ($TiO_2$): | (Example 28) |

With respect to the resulting exhaust gas cleaners of Examples 18-28, a regeneration temperature and a conversion rate of NOx to $N_2$ at the regeneration temperature were measured in the same manner as in Example 17. The results are shown in Table 3.

COMPARATIVE EXAMPLE 17

In the same manner as in Example 17, a ceramic foam-type filter made of cordierite was coated with $TiO_2$ in an amount of 10 weight % based on the filter, by using a wash-coating method. The coated filter was impregnated with Cu in an amount of 1 weight % based on the filter by using an aqueous solution of $CuCl_2$, dried and burned in the same manner as in Example 17.

With respect to the resulting exhausts gas cleaner, a regeneration temperature and a conversion rate of NOx to $N_2$ at the regeneration temperature were measured in the same manner as in Example 17. The results are shown in Table 3.

TABLE 3

| No. | Regeneration Temp. (°C.) | Conversion Rate of NOx to $N_2$[1] (%) |
|---|---|---|
| Example 17 | 340 | 50 |
| Example 18 | 360 | 40 |
| Example 19 | 370 | 35 |
| Example 20 | 370 | 35 |
| Example 21 | 360 | 45 |
| Example 22 | 365 | 35 |
| Example 23 | 380 | 30 |
| Example 24 | 380 | 30 |
| Example 25 | 385 | 40 |
| Example 26 | 390 | 35 |
| Example 27 | 395 | 30 |
| Example 28 | 395 | 30 |
| Comparative Example 17 | 450 | 20 |

Note
[1]Calculated from the amount (Xa) of NOx in exhaust gas before entering into the filter, and the amount of (Xb) of NOx in exhaust gas after passage through the filter, by using the formula: (Xa − Xb)/Xa.

As is clear from Table 3, the exhaust gas cleaners of Examples 17-28 show as high conversion rates of NOx to $N_2$ as 30% or more. Also, at the regeneration temperature of the filter at which particulate matter is ignited and burned, exhaust gas is efficiently cleaned in the present invention.

EXAMPLE 29

A ceramic foam-type filter made of cordierite (apparent volume: 2 l, density: 0.65 g/ml) was coated with $TiO_2$ powder in an amount of 10 weight % based on the filter, by a wash-coating method.

The coated filter was impregnated with 1 weight % of Cu by using an aqueous solution of $CuCl_2$, 1 weight % of La by using an aqueous solution of $La(NO_3)_3$, and 1 weight % of Cs by using an aqueous solution of $CsNO_3$, each based on $TiO_2$. After drying the impregnated filter, it was burned at 700° C. Next, the burned filter was impregnated with 1 weight % of V by using an aqueous solution of $NH_4VO_3$ and oxalic acid. After drying the impregnated filter, it was burned again at 700° C. for 3 hours to produce an exhaust gas cleaner.
Composition: Cs/Cu/La/V ($TiO_2$)

With respect to this exhaust gas cleaner, a regeneration temperature of the filter and a conversion rate of NOx to $N_2$ at the regeneration temperature were measured by using a diesel engine having a displacement of 510 cc. The regeneration temperature and the conversion rate of NOx to $N_2$ were evaluated at two points, i.e., at a time when decrease in pressure drop was observed for the first time in an initial stage of the operation, and at a time when decrease in pressure drop was observed after the lapse of 10 hours from the initiation of the operation. The diesel engine was operated at 1500 rpm under a load of 90%. Under these conditions, the exhaust gas comprised 150 ppm of HC (total of hydrocarbons), 460 ppm of CO, 480 ppm of NOx, 10% of $O_2$ and 200 ppm of $SO_2$. The results are shown in Table 4.

EXAMPLE 30

Example 29 was repeated except for using $Al_2O_3$ in an amount of 10 weight % based on the filter as a ceramic carrier powder, and impregnating 1 weight %, based on the $Al_2O_3$ layer, of Ce by using $Ce(NO_3)_3$ in place of $La(NO_3)_3$.

| Composition: | Cs/Cu/Ce/V ($Al_2O_3$) |
|---|---|

EXAMPLE 31

Example 29 was repeated except for using $Al_2O_3$-$ZrO_2$ in an amount of 10 weight % based on the filter as a ceramic carrier powder, and impregnating 1 weight %, based on the $Al_2O_3$-$ZrO_2$ layer, of K by using KCl in place of $CsNO_3$.

| Composition: | K/Cu/La/V ($Al_2O_3$-$ZrO_2$) |
|---|---|

EXAMPLE 32

Example 30 was repeated except for using $ZrO_2$ in an amount of 10 weight % based on the filter as a ceramic carrier powder, and impregnating 1 weight %, based on the $ZrO_2$ layer, of K by using KCl in place of $CsNO_3$.

| Composition: | K/Cu/Ce/V ($ZrO_2$) |
|---|---|

EXAMPLES 33-36

Examples 29-32 were repeated except for using $CoCl_2$ in place of $CuCl_2$, and changing the types of ceramic carrier powder.

| Cs/Co/La/V ($TiO_2$-$ZrO_2$): | (Example 33) |
|---|---|
| Cs/Co/Ce/V ($TiO_2$): | (Example 34) |
| K/Co/La/V ($TiO_2$): | (Example 35) |
| K/Co/Ce/V ($TiO_2$): | (Example 36) |

EXAMPLES 37-40

Examples 29-32 were repeated except for using manganese acetate in place of $CuCl_2$, and changing the types of ceramic carrier powder.

| Cs/Mn/La/V ($TiO_2$): | (Example 37) |
|---|---|
| Cs/Mn/Ce/V ($TiO_2$): | (Example 38) |
| K/Mn/La/V ($TiO_2$): | (Example 39) |
| K/Mn/Ce/V ($TiO_2$): | (Example 40) |

COMPARATIVE EXAMPLE 18

In the same manner as in Example 29, a ceramic foam-type filter made of cordierite was coated with $TiO_2$ in an amount of 10 weight % based on the filter, by using a wash-coating method. The coated filter was impregnated with Cu in an amount of 1 weight % based on the filter by using an aqueous solution of $CuCl_2$, dried and burned in the same manner as in Example 29.

With respect to the resulting exhaust gas cleaners of Examples 30-40 and Comparative Example 18, a regeneration temperature and a conversion rate of NOx to $N_2$ at the regeneration temperature were measured in the same manner as in Example 29. The results are shown in Table 4.

TABLE 4

| No. | Initial Stage[1] Regeneration Temp. (°C.) | Initial Stage[1] Conversion Rate of NOx to $N_2$[3] (%) | After 10 Hours[2] Regeneration Temp. (°C.) | After 10 Hours[2] Conversion Rate of NOx to $N_2$[3] (%) |
|---|---|---|---|---|
| Example 29 | 380 | 40 | 382 | 38 |
| Example 30 | 385 | 35 | 385 | 32 |
| Example 31 | 400 | 25 | 403 | 22 |
| Example 32 | 400 | 25 | 405 | 22 |
| Example 33 | 385 | 30 | 390 | 28 |
| Example 34 | 390 | 25 | 395 | 23 |
| Example 35 | 405 | 20 | 408 | 19 |
| Example 36 | 405 | 20 | 408 | 18 |
| Example 37 | 400 | 30 | 410 | 28 |
| Example 38 | 405 | 25 | 415 | 24 |
| Example 39 | 410 | 20 | 420 | 18 |
| Example 40 | 410 | 20 | 420 | 18 |
| Comparative Example 18 | 450 | 20 | 500 | 10 |

Note
[1] Measured at a time when decrease in pressure drop was first appreciated.
[2] Measured at a time when decrease in pressure drop was first appreciated after 10 hours from the initiation of passing exhaust gas through the filter.
[3] Calculated from the amount (Xa) of NOx in exhaust gas before entering into the filter, and the amount of (Xb) of NOx in exhaust gas after passage through the filter, by using the formula: (Xa − Xb)/Xa.

As is clear from Table 4, the exhaust gas cleaners of Examples 29-40 show high conversion rates of NOx to $N_2$ than those of Comparative Example 18, when 10 hours passed after the operation had started. Also, at a time after the lapse of 10 hours, the regeneration temperature of the filter at which particulate matter is ignited and burned is lower in Examples than in Comparative Example, meaning that exhaust gas is efficiently cleaned for a long period of time in the present invention.

EXAMPLE 41

A ceramic foam-type filter made of cordierite (apparent volume: 1 l, density: 0.65 g/ml) was coated with $TiO_2$ powder in an amount of 10 weight % based on the filter, by a wash-coating method. The coated filter was impregnated with 1 weight % of Cs by using an aqueous solution of $CsNO_3$, 2 weight % of Cu by using an aqueous solution of $CuCl_2$, 1 weight % of La by using an aqueous solution of $La(NO_3)_3$, each based on $TiO_2$. Next, the impregnated filter was further impregnated with 1 weight % of V by using an aqueous solution of $NH_4VO_3$ and oxalic acid. After drying the impregnated filter, it was burned at 700° C. for 3 hours to prepare a first filter.

The same type of ceramic foam-type filter as above (apparent volume: 0.2 l, density: 0.65 g/ml) was coated with $\gamma$-$Al_2O_3$ powder in an amount of 10 weight % based on the filter, by a wash-coating method. The coated filter was impregnated with 0.1 weight %, based on $\gamma$-$Al_2O_3$, of Pt by using an aqueous solution of $H_2PtCl_6$. After drying the impregnated filter, it was burned at 700° C. to prepare a second filter.

The first and second filters were stacked such that the first filter was positioned on the inlet side, while the second filter was positioned on the outlet side, to produce an exhaust gas cleaner having the following composition:

Cs/Cu/V/La/TiO$_2$-Pt/Al$_2$O$_3$

With respect to this exhaust gas cleaner, a regeneration temperature of the filter and a conversion rate of NOx to N$_2$ at the regeneration temperature were measured by using a diesel engine having a displacement of 510 cc. The regeneration temperature and the conversion rate of NOx to N$_2$ were evaluated at two points, i.e., at a time when decrease in pressure drop was observed for the first time in an initial stage of the operation, and at a time when decrease in pressure drop was observed after the lapse of 10 hours from the initiation of the operation. The diesel engine was operated at 2500 rpm under a load of 80%. Under these conditions, the exhaust gas comprised 90 ppm of HC (total of hydrocarbons), 460 ppm of CO, 480 ppm of NOx, 8% of O$_2$ and 100 ppm of SO$_2$. The results are shown in Table 5.

EXAMPLE 42

In the same manner as in Example 41, a first filter was prepared by coating TiO$_2$ in an amount of 10 weight % based on the filter and impregnating it with 1 weight % of Cs by using an aqueous solution of CsNO$_3$, 2 weight % of Cu by using an aqueous solution of CuCl$_2$, 1 weight % of Ce by using an aqueous solution of Ce(NO$_3$)$_3$, each based on TiO$_2$, and then impregnating the filter with 1 weight % of V.

This first filter was stacked with the second filter obtained in Example 41 to produce an exhaust gas cleaner having the following composition:

Cs/Cu/V/Ce/TiO$_2$-Pt/Al$_2$O$_3$

EXAMPLE 43

In the same manner as in Example 41, a first filter was prepared by coating TiO$_2$ in an amount of 10 weight % based on the filter and impregnating it with 1 weight % of K by using an aqueous solution of K$_2$CO$_3$, 2 weight % of Cu by using an aqueous solution of Cu(NO$_3$)$_2$, and 1 weight % of La by using an aqueous solution of La(NO$_3$)$_3$, each based on TiO$_2$, and then impregnating the filter with 1 weight % of V.

This first filter was stacked with the second filter obtained in Example 41 to produce an exhaust gas cleaner having the following composition:

K/Cu/V/La/TiO$_2$-Pt/Al$_2$O$_3$

EXAMPLE 44

In the same manner as in Example 41, a first filter was prepared by coating TiO$_2$ in an amount of 10 weight % based on the filter and impregnating it with 1 weight % of K by using an aqueous solution of K$_2$CO$_3$, 2 weight % of Cu by using an aqueous solution of Cu(NO$_3$)$_2$, and 1 weight % of Ce by using an aqueous solution of Ce(NO$_3$)$_3$, each based on TiO$_2$, and then impregnating the filter with 1 weight % of V.

This first filter was stacked with the second filter obtained in Example 41 to produce an exhaust gas cleaner having the following composition:

K/Cu/V/Ce/TiO$_2$-Pt/Al$_2$O$_3$

With respect to the resulting exhaust gas cleaners of Examples 42–44, a regeneration temperature and a conversion rate of NOx to N$_2$ at the regeneration temperature were measured in the same manner as in Example 41. The results are shown in Table 5.

EXAMPLES 45–47

The same first filters as in Examples 42–44 were prepared.

On the other hand, TiO$_2$ was dispersed in an aqueous solution of PdCl$_2$ (Example 45), in an aqueous solution of H$_2$PtCl$_6$ (Example 46), and in an aqueous solution of H$_2$PtCl$_6$ and PdCl$_2$ (Example 47), to impregnate it with 0.1 weight % of Pd (Example 45), 0.1 weight % of Pt (Example 46), and 0.1 weight % of Pt+0.1 weight % of Pd (Example 47). Each ceramic foam-type filter made of cordierite (apparent volume: 0.2 l, density: 0.65 g/ml) was coated with the above TiO$_2$ carrying the Pt-group metal to prepare a second filter.

The first and second filters were stacked in the same manner as in Example 41, to produce an exhaust gas cleaner having the following composition:

| | |
|---|---|
| Cs/Cu/V/La/TiO$_2$-Pd/TiO$_2$ | (Example 45) |
| Cs/Cu/V/Ce/TiO$_2$-Pt/TiO$_2$ | (Example 46) |
| K/Cu/V/La/TiO$_2$-Pt, Pd/TiO$_2$ | (Example 47) |

With respect to the resulting exhaust gas cleaners of Examples 45–47, a regeneration temperature and a conversion rate of NOx to N$_2$ at the regeneration temperature were measured in the same manner as in Example 41. The results are shown in Table 5.

COMPARATIVE EXAMPLE 19

Example 41 was repeated except for using only Cu in the catalyst applied to the first filter. The resulting exhaust gas cleaner had the following composition:

Cu/TiO$_2$-Pt/Al$_2$O$_3$

A regeneration temperature and a conversion rate of NOx to N$_2$ at the regeneration temperature were measured in the same manner as in Example 41. The results are shown in Table 5.

TABLE 5

| No.[2] | Regen. Temp (°C.) | Initial Stage[1] Conversion Rate of NOx to N$_2$[3] | | | Regen. Temp (°C.) | After 10 Hours[4] Conversion Rate of NOx to N$_2$[3] | | |
|---|---|---|---|---|---|---|---|---|
| | | NOx | CO | HC | | NOx | CO | HC |
| Ex. 41 | 380 | 10 | 55 | 40 | 390 | 8 | 50 | 38 |
| Ex. 42 | 385 | 12 | 55 | 40 | 395 | 10 | 50 | 38 |
| Ex. 43 | 400 | 8 | 57 | 39 | 400 | 8 | 55 | 38 |
| Ex. 44 | 410 | 7 | 58 | 39 | 405 | 7 | 55 | 38 |
| Ex. 45 | 385 | 10 | 50 | 30 | 390 | 8 | 45 | 28 |
| Ex. 46 | 385 | 12 | 60 | 50 | 390 | 10 | 58 | 48 |
| Ex. 47 | 405 | 15 | 70 | 60 | 400 | 12 | 65 | 58 |

TABLE 5-continued

| No.[2] | Initial Stage[1] Conversion Rate of NOx to $N_2$[3] | | | | After 10 Hours[4] Conversion Rate of NOx to $N_2$[3] | | | |
|---|---|---|---|---|---|---|---|---|
| | Regen. Temp (°C.) | NOx | CO | HC | Regen. Temp (°C.) | NOx | CO | HC |
| Com. Ex. 19 | 450 | 5 | 30 | 20 | 530 | 2 | 15 | 10 |

Note
[1] Measured at a time when decrease in pressure drop was first appreciated.
[2] Ex.: Example, and Com. Ex.: Comparative Example.
[3] Calculated from the amount (Xa) of NOx in exhaust gas before entering into the filter, and the amount of (Xb) of NOx in exhaust gas after passage through the filter, by using the formula: (Xa − Xb)/Xa.
[4] Measured at a time when decrease in pressure drop was first appreciated after 10 hours from the initiation of passing exhaust gas through the filter.

As is clear from Table 5, the exhaust gas cleaners of Examples 41-47 show higher cleaning efficiency than those of Comparative Example 19 even after the lapse of 10 hours. Also, at that time, the regeneration temperature of the filter at which particulate matter is ignited and burned is lower in Examples than in Comparative Example.

As described above in detail, by using the exhaust gas cleaner according to the present invention, both particulate matter and NOx can efficiently be removed from the exhaust gas. Such exhaust gas cleaners are effective for cleaning exhaust gases even at a low temperature, such as those of diesel engines. Also, since the catalyst contains Co and/or Mn and V as transition metals, the efficiency of the catalyst is kept high for a long period of time even when it is in contact with an exhaust gas containing a high concentration of $SO_2$.

In the first exhaust gas cleaner of the present invention, since the catalyst is supported by the porous ceramic carrier powder layer formed on the filter by a wash-coating method, a sol-gel method, etc., the catalyst can be uniformly supported on the filter in a high concentration, leading to a good catalytic activity.

In the second exhaust gas cleaner of the present invention, since a uniform mixture of the catalyst with the porous ceramic carrier powder is supported by the filter, it suffers from only little pressure drop, thereby effecting the removal of both particulate matter and NOx efficiently.

In the third exhaust gas cleaner of the present invention, since the catalyst having a particular composition is supported by the filter in an extremely small amount, high reactivity of HC with particulate matter and unburned hydrocarbons can be maintained for a long period of time.

In the fourth exhaust gas cleaner of the present invention, since the first and second catalyst are combined, NOx and particulate matter, HC, CO, etc. are efficiently removed from the exhaust gas for a long period of time.

The exhaust cleaner and the exhaust gas-cleaning method according to the present invention are highly useful for cleaning the exhaust gas of diesel engines, etc.

What is claimed is:

1. An exhaust gas cleaner comprising a heat-resistant, porous filter, a porous ceramic powder layer formed on said filter in an amount of 3-15 parts by weight per 100 parts by weight of said filter, and a catalyst in an amount of 1-40 weight % based on the ceramic powder layer and supported by said ceramic powder layer, said catalyst consisting essentially of:
   (a) at least one element selected from the group consisting of K and Cs in an amount of 10-50 weight % based on the total weight of the catalyst on a metal basis;
   (b) at least one element selected from the group consisting of Co and Mn in an amount of 15-65 weight % based on the total weight of the catalyst on a metal basis;
   (c) V in an amount of 15-65 weight % based on the total weight of the catalyst on a metal basis, the total amount of components (b) and (c) being 30-80 weight %; and
   (d) at least one element selected from the group consisting of Ce and La in an amount of 10-50 weight % based on the total weight of the catalyst on a metal basis.

2. The exhaust gas cleaner according to claim 1, wherein said ceramic powder layer is made of $TiO_2$.

3. An exhaust gas cleaner comprising a heat-resistant, porous filter, a first catalyst supported by a ceramic powder carrier formed on said filter in the inlet region of said filter, and a second catalyst supported by a ceramic powder carrier formed on said filter in the outlet region, said first catalyst consisting essentially of:
   (a) at least one element selected from the group consisting of K and Cs in an amount of 10-50 weight % based on the total weight of the catalyst on a metal basis;
   (b) at least one element selected from the group consisting of Cu, Co, Mn and Mo in an amount of 15-65 weight % based on the total weight of the catalyst on a metal basis;
   (c) V in an amount of 15-65 weight % based on the total weight of the catalyst on a metal basis; and
   (d) at least one element selected from the group consisting of Ce and La in an amount of 10-50 weight % based on the total weight of the catalyst on a metal basis,
   said first catalyst being 0.05-6 weight % based on the ceramic powder layer on a metal basis; and said second catalyst consisting essentially of at least one platinum-group element in an amount of 0.1-1 weight % based on the ceramic powder layer on a metal basis.

4. An exhaust gas cleaner comprising a heat-resistant, porous filter, and a catalytic layer formed on said filter, said catalytic layer comprising a uniform mixture of a catalyst and a ceramic powder carrier, said catalyst consisting essentially of:
   (a) at least one element selected from the group consisting of K and Cs in an amount of 10-50 weight % based on the total weight of the catalyst on a metal basis;
   (b) at least one element selected from the group consisting of Co and Mn in an amount of 15-65 weight % based on the total weight of the catalyst on a metal basis;
   (c) V in an amount of 15-65 weight % based on the total weight of the catalyst on a metal basis, the total amount of components (b) and (c) being 30–80 weight %; and (d) at least one element selected from the group consisting of Ce and La in an amount of 15–65 weight % based on the total weight of the catalyst on a metal basis, said catalyst being 1–20 parts by weight and said ceramic powder carrier being 1–10 parts by weight per 100 parts by weight of said filter.

5. The exhaust gas cleaner according to claim 4, wherein said ceramic powder carrier is made of $TiO_2$.

6. The exhaust gas cleaner according to claim 3, wherein said second catalyst further contains Au and/or Ag.

7. The exhaust gas cleaner according to claim 3, wherein said two catalysts are supported by a ceramic carrier powder layer formed on said filter.

8. The exhaust gas cleaner according to claim 6, wherein said two catalysts are supported by a ceramic carrier powder layer formed on said filter.

* * * * *